United States Patent Office 2,891,867
Patented June 23, 1959

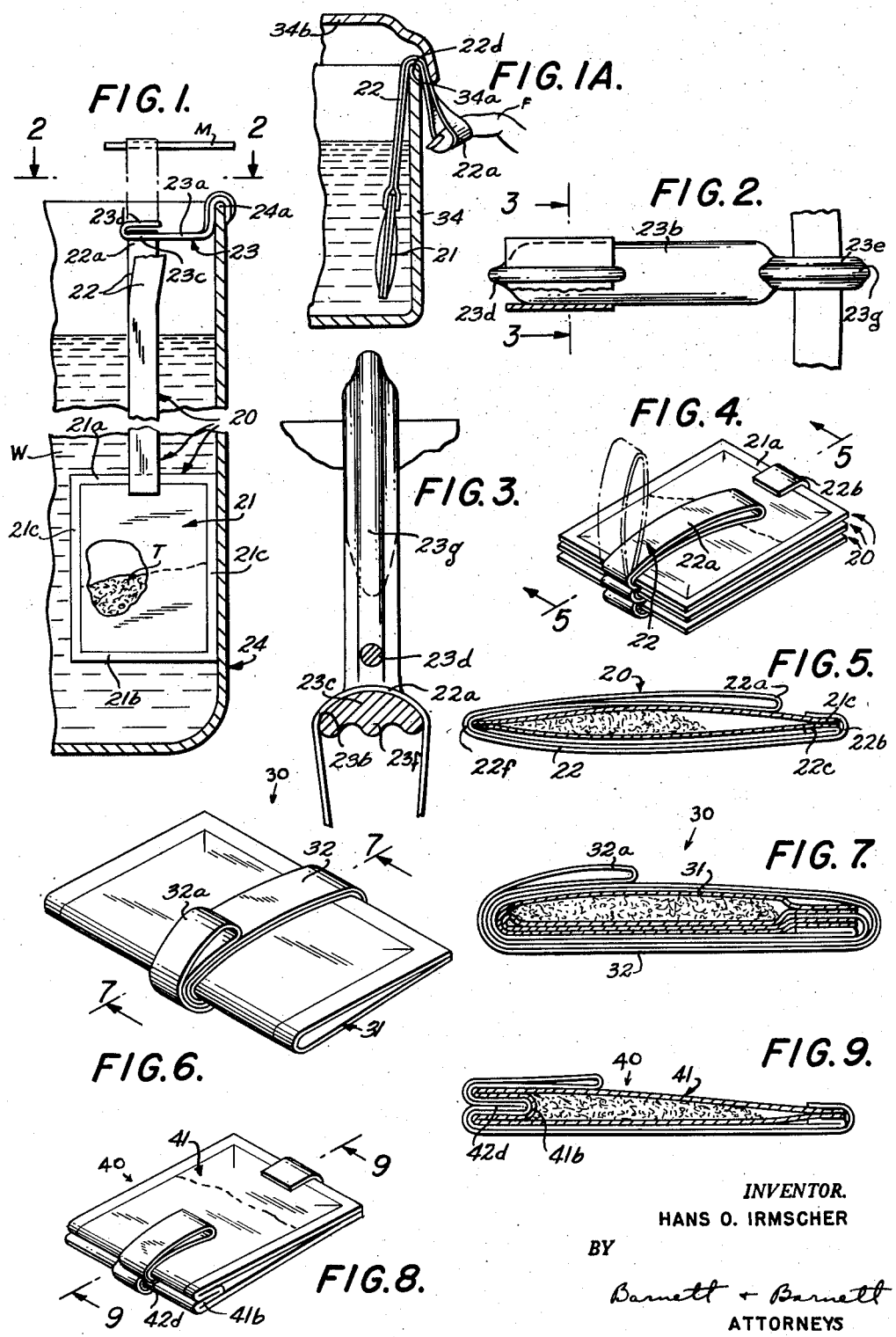

2,891,867

INFUSION PACKAGES WITH IMPROVED LOOP HANDLE SUSPENSION CONSTRUCTIONS

Hans O. Irmscher, Uniondale, N.Y., assignor to National Tea Packing Company, Inc., Long Island City, N.Y., a corporation of New York Application October 25, 1955, Serial No. 542,650

4 Claims. (Cl. 99—77.1)

This invention relates to the manufacture of filled packages formed with filtering infusion bags through which the contents are dissolved or brewed, and more particularly is directed to infusion packages, such as, tea bags and the like articles, the suspended mounting combination therewith, and the use thereof in promoting a more sanitary and improved handling for brewing and packaging.

Among the objects of the invention is to generally improve the construction for filled bags in the form of infusion packages of the character described as inexpensive articles of manufacture and as combinations thereof with suspended mountings which shall comprise few and simple parts, which shall be easy and cheap to manufacture, which shall be capable of quantity production on high speed packaging machines, which shall provide infusion packages with looped suspension handles of improved construction and which shall be practical and efficient to a high degree in use.

Other objects of the invention will in part be obvious and in part hereinafter pointed out.

The invention accordingly consists of features of construction, combination of elements and arrangement of parts which will be exemplified in the constructions hereinafter disclosed, the scope of the application of which will be indicated in the claims following.

In the accompanying drawing in which various illustrative embodiments of the invention are shown:

Fig. 1 is a fragmentary view partly in section showing an improved tea bag, such as used to prepare a brew for an iced-tea beverage, suspended in a relatively deep brewing urn, partly in section, with the urn cover removed, dot and dash lines indicating the method of mounting as embodying the invention.

Fig. 1A is a fragmentary view partly in section like Fig. 1, but showing the improved tea bag suspended in a relatively shallow urn with the urn cover in effective position in a manner to practice the invention without the use of an overhang mounting support for the improved tea bag shown in Fig. 1.

Figs. 2 and 3 are enlarged fragmentary cross-sectional views taken on lines 2—2 and 3—3 in Figs. 1 and 2, respectively, showing details of the improved suspension support.

Fig. 4 is a perspective view of a stack of tea bags as may be packaged in a carton ready for use and utilizing the invention showing a loop handle portion folded down in full lines and in dot and dash lines raised to facilitate removal or transfer to be suspended in brewing urns as shown in Figs. 1 and 1A.

Figs. 5, 7 and 9 are cross-sectional views taken on lines 5—5, 7—7 and 9—9 in Figs. 4, 6 and 8, respectively, showing details for positioning the down-folded loop handles of each form of tea bag including the folded over packaged form and expansion type as shown in Figs. 6 and 8, respectively, and Figs. 6 and 8 are perspective views similar to Fig. 4, but each showing only one package of a stack with said tea bag in Fig. 6 folded over along a mid-portion thereof and the suspension loop handle wound completely around the folded bag structure, and the tea bag in Fig. 8 being of the expansion type with a portion of the suspension loop handle in-folded into the unexpanded structure of the tea bag.

Referring in detail to the drawing, 20 denotes an infusion package of improved construction embodying the invention and, as here shown, may be of the tea bag pillow type used to prepare a brew or essence for an iced-tea beverage, for example, as utilized by hotels, restaurants, diners and luncheonettes and less frequently in households. Such iced-tea brewing infusion package 20 is usually more than four times as large as the conventional tea bag that is brewed in a cup.

Said iced-tea brewing bag 20 may comprise an envelope or wrapper 21 formed of suitable filtering sheet material, for example, such as, gauze or adhesive coated relatively high wet strength filter paper having sewn or heat-sealed top, bottom and side edge joint seams 21a, 21b and 21c, respectively, enclosing tea contents T which may only partially fill the heat-sealed envelope 21, as is clear from Figs. 1 and 5, said bottom edge seam 21b, herein referred to as an edge joint, may, if desired, be formed as a folded continuous portion extending between the opposite sides of envelope 21 similar to bag 40 without bottom pleat 41b thereof, as is clear from Figs. 4, 5, 8 and 9.

Each bag 20 includes also a loop or multi-ply suspension ribbon handle 22 which may be formed of the same or like wet strength sheet material as bag 20 but from a strip or tape folded over and constructed to have looped portion 22a at one end. The other end 22b of said handle 22 may be attached in any suitable manner, as by heat-sealed lapping joints 22c, to opposite faces of top heat-sealed edge joint 21a at a mid-length portion thereof, as is clear from Figs. 1, 4 and 5. Said looped end portion 22a may extend a length distance of the suspension handle 22 sufficient to be conveniently spread for accommodating suitable tongs or other lifting means M when removing the tea bag 20 from a carton stacked position shown in Fig. 4 to mount said tea bag 20 in hanging position for brewing with said looped end portion 22a removably engaging an overhanging portion 23a of a support fitting 23 extending into urn 24. Said fitting may be detachably mounted on rim edge 24a of the urn 24 so that the tea bag 20 may be immersed in steeping water W contained in said urn 24 in position and to a depth for most efficient brewing, as is clear from Figs. 1 to 3.

It should be noted that, if desired, fitting 23 can and may be detached from the urn 24 for use to move the tea bag 20 from the carton into brewing position serving for such purpose as a substitute for said lifting means M.

Where an urn 24 used for brewing has a depth greater than the length of tea bag handle 22, said fitting 23 has been found to give most effective results and, as shown in Figs. 2 and 3, overhanging portion 23a, which is horizontally disposed, may have upfacing surface 23b of a load bearing end 23c of arcuate contour corresponding to the spread shape of handle loop portion 22a positioned thereon, said load bearing end 23c being formed with an upstanding hook-shaped finial 23d that prevents accidental disengagement movement of said loop portion 22a from the overhanging portion 23a and undesirable consequences of releasing the tea bag 20 from its suspension to require a messy fishing operation of the latter from the brewing liquid W, as is clear from Fig. 1.

Said fitting 23 may be made of suitable cast or molded material as a single piece having an end portion thereof opposite said load bearing end 23c formed with an urn rim edge clip-on attachment means 23e for ready mounting and removal, the latter being disposed in a relatively right angle relation to the load bearing end 23c with hook-shaped finial 23d so that weight of the tea bags 20 suspended from load bearing end 23c positively keeps the said clip-on attachment means 23e anchored to the urn rim edge 24a.

Integrally formed reinforcing ribs or webs 23f and 23g may be provided to extend along overhanging portion 23a and about clip-on end 23e to take up any excessive stress and strain to which fitting 23 may be subjected in use, as is clear from Figs. 1 to 3.

Where a relatively shallow urn 34 is used for brewing as shown in Fig. 1A, fitting 23 may be eliminated and the loop suspension handle 22 folded transversely thereof, as at 22d, to embrace a portion of the rim edge 34a thereby foreshortening the effective length of handle 22 for positioning, said fold 22d being positioned under the rim closure of urn cover 34b with the loop end portion 22a extending along the exterior side of urn 34 for ready removal after brewing when the tea bag 20 is spent. In the above described arrangement, said effective length of handle 22 may be adjusted so that the tea bag 20 is immersed to a depth for most efficient brewing, as is clear from Fig. 1a.

Tea bags 20 are preferably packaged for delivery to the user stacked in cartons, as for example, like those described in my Patent No. 2,577,765, granted December 11, 1951, so that such tea bags 20 can conveniently be individually removed. To this end and, as is clear from Figs. 1 and 4, tea bag suspension handles 22 each may be wound about envelope 21 to lie against the under side thereof and crease folded at 22f transversely a mid-length of said handle 22 passing bottom joint seam 21b to position loop end portion 22a at the upfacing side of the envelope 21 in a readily accessible position for being engaged by load bearing end 23c of fitting 23 or other lifting means to be transferred to either urn 24 or 34 in the brewing operation.

The utility of the invention will now be apparent. After tea bags 20 have been manufactured each having an envelope partially filled with tea contents T and provided with suspension handles 22 formed with loop end portions 22a, said tea bags 20 may be stacked in cartons in the manner shown in Fig. 4 ready for use. Individual tea bags 20 may be transferred from said stack to either urn 24 or 34 for highly efficient brewing, as described above in a most sanitary way without having the user personally touch tea bags 20, and with the least danger of accidental injury from contacting hot or boiling brew.

Spent tea bags 20, after the brewing operation is finished, may be readily removed using the looped ends 22a thereof to more positively hold and control the expendable tea bags to a waste receptacle in the well understood manner.

It should be noted that the handle crease fold 22f provides for stack packaging of tea bags 20 and may also serve as foreshortening fold 22d described for the use of tea bags 20 with said shallow depth urn 34.

In carton packaging stacks of iced-tea brewing bags like 20 of relatively large dimension, it is often found expedient to provide a folded over package form 30 as shown in Figs. 6 and 7 which may be stacked in the manner shown in Figs. 4 and 5 above described. In such event, the suspension handle 32 may be provided in a length greater than twice the length of the folded over envelope 31, as is clearly indicated in Fig. 7, to be fully wound about the folded over envelope 31 thereby positioning the loop end portion 32a for convenient assembly and removal manipulations in the same manner as described above for the stacked tea bags 20 shown in Figs. 4 and 5.

The invention is also applicable for producing tea bags 40 having expansion features such as shown and described in my Patent No. 2,571,138, granted October 16, 1951, where envelope 41 thereof may be provided with a bottom in-folded pleat 41b which expands during the brewing operation. Said pleat 41b may be utilized to retain a folded-in portion 42d instead of providing the handle fold 22d described above for tea bags 20, said retention of folded-in portion 42d being more positive and efficient in keeping stacked packages individually in as compact a form as possible.

Tea bags 30 and 40 may be utilized in the same manner as described above for tea bags 20.

The invention may also be used for brewing bags of similar construction having various other contents, such as, coffee or the like steeping materials.

Loop end portions 22a and 32a may also be readily engaged by a finger F instead of tongs M for lifting tea bags 20, 30 or 40 in said transfer movement from a carton stacked position into brewing position in urn 34 and for removal therefrom for disposal after brewing and, furthermore, provides safety means serving as a possible injury eliminator since the need for the general practice of hand grasping mid-portion of the handle 22 is made wholly unnecessary, as is clear from Figs. 1, 1A and 4.

It is thus seen that there are provided infusion packages with improved loop handle suspension constructions whereby the several objects of this invention are achieved and which are well adapted to meet the conditions of practical use.

As various possible embodiments might be made of the above invention and as various changes might be made in the embodiments above set forth, it is to be understood that all matters herein set forth or shown in the accompanying drawing are to be interpreted as illustrative and not in a limiting sense.

Having thus described my invention, I claim as new and desire to secure by Letters Patent:

1. A plurality of infusion packages stacked in face to face relation, each of said packages comprising a flattened pillow-shaped bag having a heat-sealed joint seam serving as a top closure and an opposite closed bottom end, a beverage infusion product enclosed within each bag, a strip handle of multi-ply material having an end thereof formed of at least two plies extending along exterior portions on opposite sides of said top closure joint and anchored by permanent fusion thereon, said handle being of greater length than the width of the package and having a flexibly foldable mid-length, the other end of said handle having the plies thereof constructed to form a suspension loop, said handle mid-length being folded and wound about said package with said entire loop positioned beyond said bottom end to give free access to said loop positioned against an exposed face of the bag when at the top of the stack and for retaining the handle to releasably embrace said bottom end in said folded position.

2. An infusion package formed of overlying sheets of filter material secured together by heat-sealing in face to face relation along edge seam joins to form a bag, a beverage infusion product enclosed within the bag, a strip handle of multi-ply material having an end thereof formed of at least two plies, half of said plies extending along each of opposite exterior side portions of one of said joints and anchored by permanent fusion thereto, said handle being of greater length than the width of the package and having a flexibly foldable mid-length, the other end of said handle having the plies thereof interconnecting in pairs forming a suspension loop for the package in brewing, said handle mid-length being folded and wound about said package with said loop positioned beyond an edge joint opposite said handle anchorage giving free access to said loop positioned against a side of the bag and retaining the handle to releasably embrace an edge joint in said folded position.

3. The infusion package defined in claim 2 in which said bag has the last mentioned edge joint embraced by the folded and wound mid-portion of the handle constructed with an inturned pleat, said handle mid-portion being in-folded into said pleat.

4. The infusion package defined in claim 2 in which said bag is over-folded across a mid-portion thereof in a plane parallel to said handle anchorage joint seam, said handle length being greater than twice the length of said folded bag.

References Cited in the file of this patent

UNITED STATES PATENTS

| | | |
|---|---|---|
| 2,291,278 | Cleaves | July 28, 1942 |
| 2,346,276 | Reittinger | Apr. 11, 1944 |
| 2,359,292 | Barnett | Oct. 3, 1944 |
| 2,470,878 | Tate | May 24, 1949 |
| 2,577,765 | Irmscher | Dec. 11, 1951 |
| 2,614,934 | Trotman | Oct. 21, 1952 |

OTHER REFERENCES

"Tea and Coffee Trade Journal," November 1954, page 13.